United States Patent
Amaya et al.

(10) Patent No.: US 11,141,920 B2
(45) Date of Patent: Oct. 12, 2021

(54) METHOD FOR PRODUCING THREE-DIMENSIONAL SHAPED PRODUCT

(71) Applicant: Matsuura Machinery Corporation, Fukui (JP)

(72) Inventors: Koichi Amaya, Fukui (JP); Mitsuyoshi Yoshida, Fukui (JP); Seiichi Tomita, Fukui (JP); Akira Takizawa, Fukui (JP); Akishige Nishikawa, Fukui (JP)

(73) Assignee: Matsuura Machinery Corporation, Fukui (JP)

(*) Notice: Subject to any disclaimer, the term of this patent is extended or adjusted under 35 U.S.C. 154(b) by 2 days.

(21) Appl. No.: 16/833,173

(22) Filed: Mar. 27, 2020

(65) Prior Publication Data
US 2021/0001557 A1    Jan. 7, 2021

(30) Foreign Application Priority Data
Jul. 3, 2019    (JP) .............................. JP2019-124176

(51) Int. Cl.
*B29C 64/371* (2017.01)
*B33Y 10/00* (2015.01)
(Continued)

(52) U.S. Cl.
CPC .......... *B29C 64/371* (2017.08); *B29C 64/153* (2017.08); *B29C 64/393* (2017.08);
(Continued)

(58) Field of Classification Search
None
See application file for complete search history.

(56) References Cited

U.S. PATENT DOCUMENTS

| 4,267,967 | A | * | 5/1981 | Beck | .................. | G05D 23/1925 |
| | | | | | | 236/49.3 |
| 2006/0099084 | A1 | * | 5/2006 | Otaki | ....................... | F24F 11/77 |
| | | | | | | 417/42 |

(Continued)

FOREIGN PATENT DOCUMENTS

| JP | 2001-124382 A | 5/2001 |
| JP | 2002-106939 A | 4/2002 |

(Continued)

*Primary Examiner* — Matthew J Daniels
*Assistant Examiner* — Mohammad M Ameen
(74) *Attorney, Agent, or Firm* — Richard M. Goldberg

(57) ABSTRACT

A method for producing a three-dimensional shaped product that employs a shaping method based on dispersion of powder by a squeegee and irradiation onto a powder layer with a laser beam or electron beam, includes the following steps: 1. Setting an upper limit value and lower limit value for the amount of circulation passing through an anemometer, and an adjusting value within this range; 2. Measuring the amount of circulation and effecting control as follows: (1) When the measured value is between the upper limit value and lower limit value, the rotational speed of the blower fan is maintained, and (2) When the measured value has fallen below the lower limit value due to clogging of a filter, the rotational speed of the fan is increased and the rotational speed is selected at the stage where the measured value has reached the adjusting value, and the rotational speed is maintained.

10 Claims, 3 Drawing Sheets

(51) Int. Cl.
*B33Y 40/00* (2020.01)
*B33Y 50/02* (2015.01)
*B29C 64/153* (2017.01)
*B29C 64/393* (2017.01)
*B33Y 30/00* (2015.01)

(52) U.S. Cl.
CPC ............ *B33Y 10/00* (2014.12); *B33Y 40/00* (2014.12); *B33Y 50/02* (2014.12); *B33Y 30/00* (2014.12)

(56) References Cited

U.S. PATENT DOCUMENTS

2012/0251378 A1* 10/2012 Abe .................. B29C 64/153
 419/55
2016/0059310 A1* 3/2016 Junker ................ B28B 17/04
 419/53

FOREIGN PATENT DOCUMENTS

| JP | 2006-153426 A | 6/2006 |
| JP | 2016-052778 A | 4/2016 |
| JP | 5948462 B1 | 6/2016 |
| JP | 2016-519711 A | 7/2016 |
| JP | 5982046 B1 | 8/2016 |
| JP | 2016-181990 A | 10/2016 |
| JP | 2017-048408 A | 3/2017 |
| WO | WO-2014-164807 A1 * | 10/2014 |

* cited by examiner

[Fig.1]
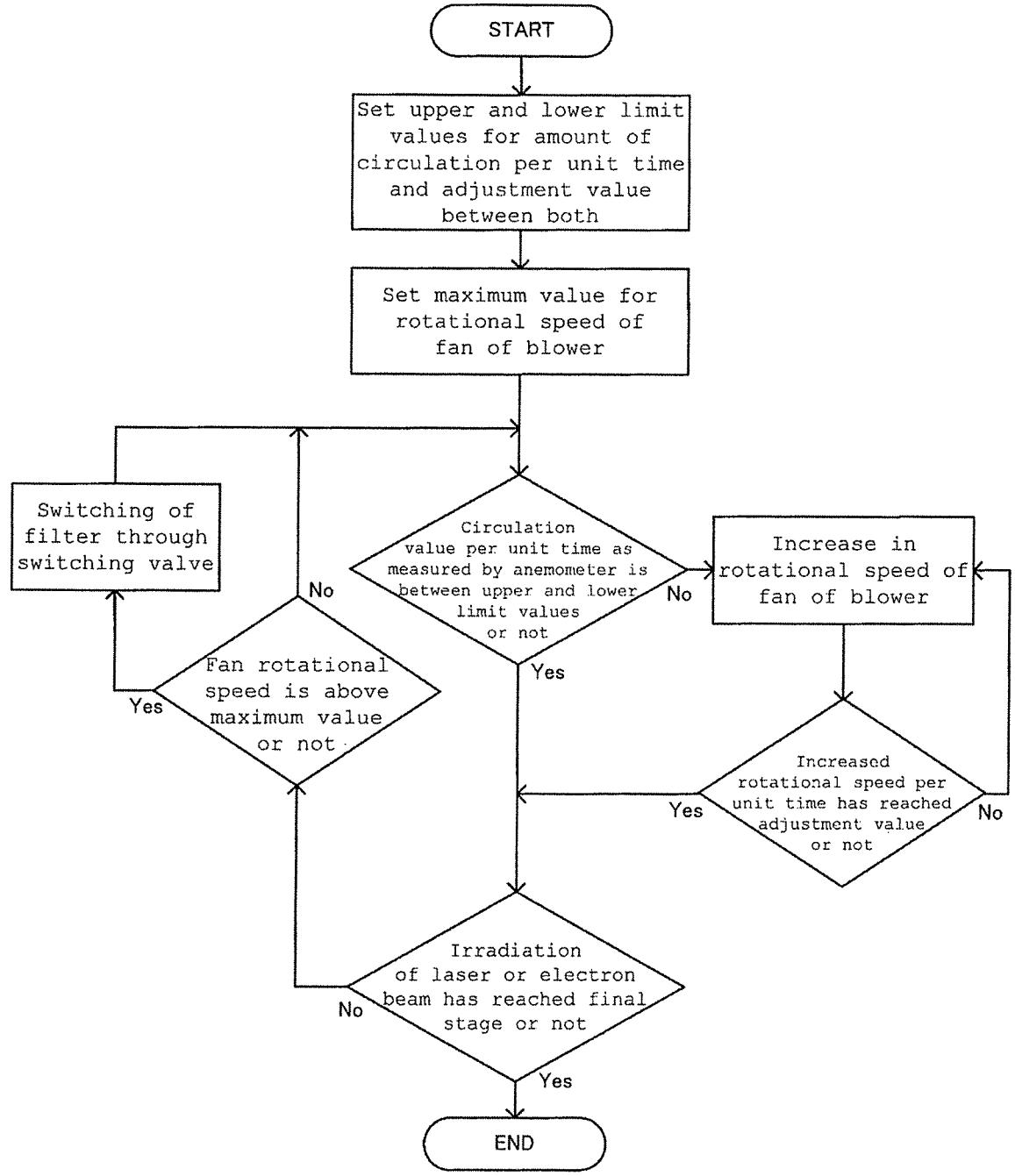

[Fig.2]
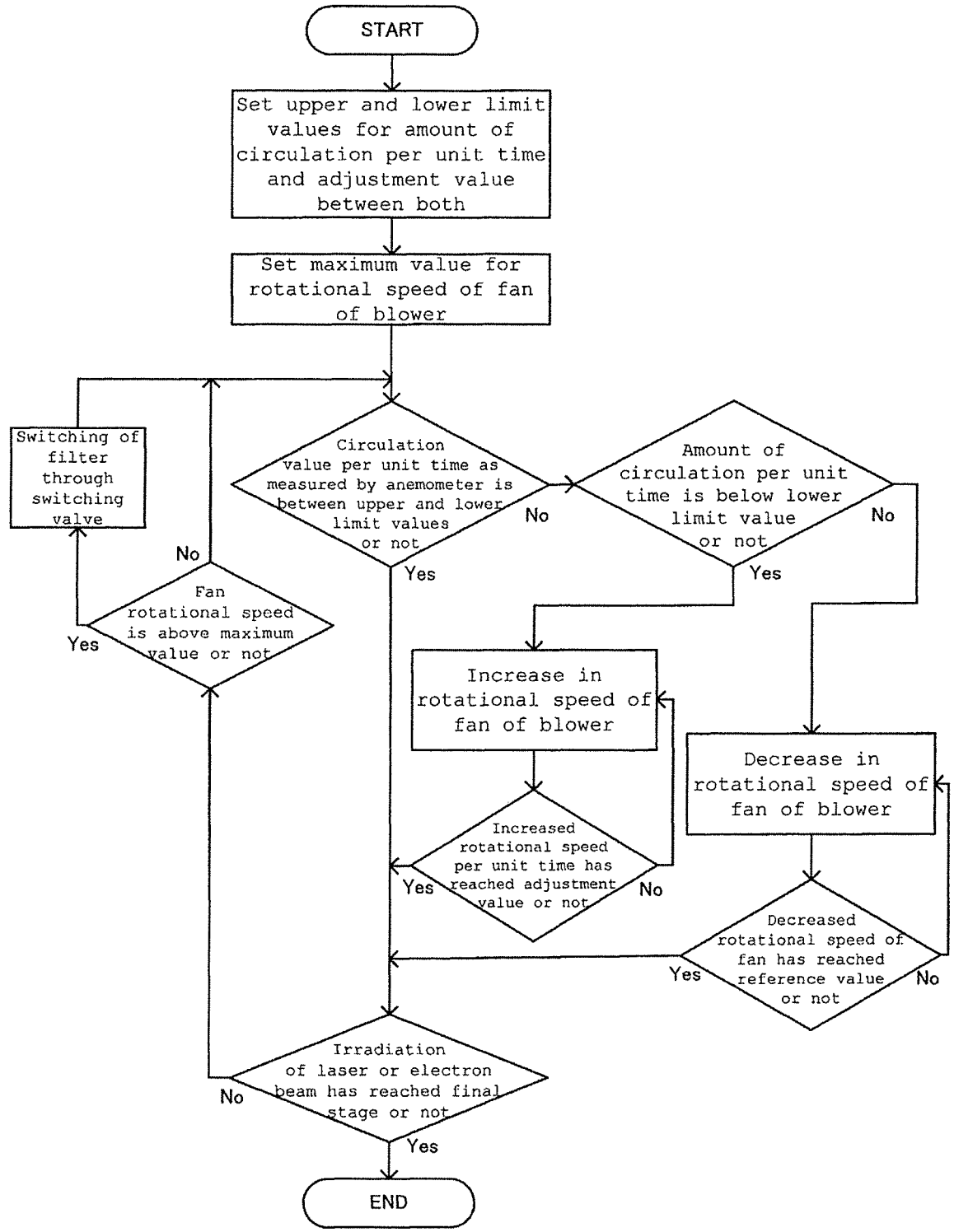

[Fig.3]
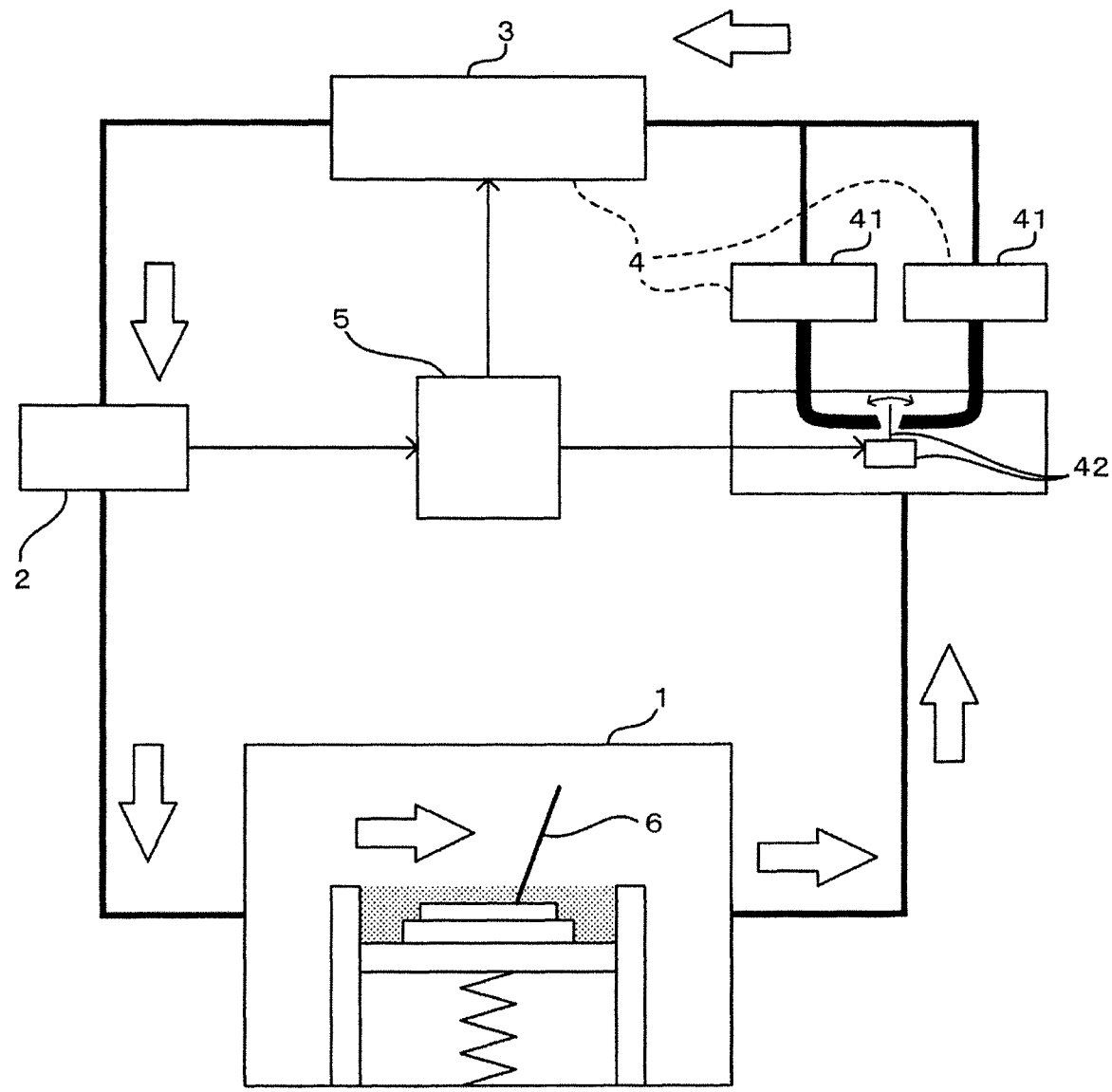

METHOD FOR PRODUCING THREE-DIMENSIONAL SHAPED PRODUCT

TECHNICAL FIELD

The present invention relates to a method for producing a three-dimensional shaped product which is generated by irradiation with a laser beam or electron beam onto a powder layer formed by traveling of a squeegee during three-dimensional shaping, wherein the inside and outside of a chamber is circulated so that the amount of fumes drifting inside the chamber is within a prescribed range, and the amount of circulation of an inert gas-containing gas per unit time is controlled.

BACKGROUND OF THE INVENTION

In three-dimensional shaping in which powder layers that have been flattened with a squeegee are irradiated with a laser beam or electron beam, the irradiation unavoidably generates fumes with smoky state.

In the chamber used for three-dimensional shaping, gas that contains an inert gas is circulated by a blower (usually installed outside of the chamber), and the amount of fumes drifting inside the chamber is greater with a lower amount of circulation of the gasper unit time, and conversely less with a higher amount of circulation.

This relationship can be easily perceived by the longer time for migration of fumes into the fume collector by drifting with a lower amount of circulation of the gas per unit time, and by the reverse situation as well.

Fumes are trapped by a filter in the fume collector that is installed outside of the three-dimensional shaping chamber, but the filter gradually becomes clogged as fumes are trapped.

Such clogging increases the resistance of the gas to circulation flow.

No special remedy exists in the prior art for such clogging, and therefore the amount of circulation of gas per unit time decreases with time, making it impossible to avoid increase in the amount of fumes drifting inside the chamber.

This situation leads to lower sintering energy of the laser beam or electron beam irradiated onto layered powder, and also the significant problem of uneven sintered density.

Many prior arts for dealing with the effects of fume drifting inside the chamber are publicly known.

Patent Document 1, for example, discloses a construction in which, after calculating a standby time during which fumes are flushed out of the chamber interior based on the sintering time or irradiation area by previous laser beam irradiations, a laser beam irradiation start command is issued after the standby time has elapsed (claim 1).

However, setting of the standby time is itself a major problem for efficient three-dimensional shaping.

Patent Document 2 discloses efficient collection of fumes by increasing the amount of circulation of inert gas circulating inside and outside the chamber, and specifically the airflow rate per unit time during circulation (paragraph [0009]).

However, even when the airflow rate per unit time has been set to a prescribed reference level or higher during circulation of inert gas, it is objectively impossible to avoid a fundamental problem wherein the amount of circulation of gas per unit time gradually decreases due to clogging of the filter of the fume collector.

Thus, the prior art neither discloses nor suggests any construction whereby the amount of fumes drifting inside the chamber are controlled to be within a prescribed range while taking into consideration clogging of the filter of the fume collector.

PRIOR ART DOCUMENTS

Patent Documents

Patent Document 1: Japanese Patent No. 5948462(B1)
Patent Document 2: Japanese Patent No. 5982046(B1)

SUMMARY OF INVENTION

Technical Problem

It is an object of the present invention to provide a method for producing a three-dimensional shaped product that can prevent reduction in the amount of circulation of inert gas-containing gas per unit time that is circulating inside and outside of the chamber, due to clogging of the filter of the fume collector.

Solution to Problem

In order to solve the aforementioned problems, the present invention includes the following basic constructions (a) and (b).

(a) A method for producing a three-dimensional shaped product which employs a forming step in a shaping region, based on dispersion of powder by a squeegee on a shaping table disposed within a chamber and irradiation onto powder layers formed by the dispersion with a laser beam or electron beam, wherein a filter that removes fumes generated from the powder layers due to the irradiation in a fume collector that traps the fumes, a blower that circulates inert gas-containing gas inside and outside the chamber, and an anemometer that communicates with the blower are installed, and so the amount of circulation of gas per unit time being circulated inside and outside the chamber is controlled by the following steps:

1. The upper limit value and the lower limit value for the amount of circulation of gasper unit time passing through the anemometer and an adjusting value within the range between the upper limit value and the lower limit value are set, and at the start of gas circulation, a numerical value is selected for the rotational speed of the fan of the blower so that an amount of circulation in the range between the upper limit value and the lower limit value is attained.

2. The amount of circulation per unit time is measured at each prescribed time intervals with the anemometer and the amount of circulation is controlled as follows:

(1) When the measured value is within the range between the upper limit value and the lower limit value, the rotational speed of the fan of the blower is maintained.

(2) When the measured value has fallen below the lower limit value due to clogging of the filter, the rotational speed of the fan of the blower is increased and the rotational speed is selected at the stage where the measured value has reached the adjusting value, and the rotational speed is maintained.

3. The control of above step 2 is repeated until circulation of the gas is complete.

(b) A method for producing a three-dimensional shaped product which employs a forming step in a shaping region, based on dispersion of powder by a squeegee on a shaping table disposed within a chamber and irradiation onto powder layers formed by the dispersion with a laser beam or electron beam, wherein a filter that removes fumes generated from the powder layers due to the irradiation in a fume collector that traps the fumes, a blower that circulates inert gas-containing gas inside and outside the chamber, and an anemometer that communicates with the blower are installed, and so the amount of circulation of gas per unit time being circulated inside and outside the chamber is controlled by the following steps:

1. The upper limit value and the lower limit value for the amount of circulation of gas per unit time passing through the anemometer and an adjusting value within the range between the upper limit value and the lower limit value are set, and at the start of gas circulation, a numerical value is selected for the rotational speed of the fan of the blower so that an amount of circulation in the range between the upper limit value and the lower limit value is attained.

2. The amount of circulation passing through per unit time is continuously measured with the anemometer and the amount of circulation is controlled as follows:

(1) When the measured value is within the range between the upper limit value and the lower limit value, the rotational speed of the fan of the blower is maintained.

(2) When the measured value has fallen below the lower limit value due to clogging of the filter, the rotational speed of the fan of the blower is increased and the rotational speed is selected at the stage where the measured value has reached the adjusting value, and the rotational speed is maintained.

3. The control of above step 2 is repeated until circulation of the gas is complete.

Advantageous Effects of Invention

With basic construction (a) that allows measurement of the amount of circulation of inert gas-containing gasper unit time at prescribed time intervals, and basic construction (b) that allows continuous measurement of the amount of circulation of inert gas-containing gas per unit time, even if the preset lower limit value is exceeded due to clogging of the filter, the exceeded state can be rapidly corrected and the amount of circulation of gas per unit time in the chamber can be set to the adjusting value that is in the range between the upper limit value and the lower limit value, so that the amount of drifting of fumes per unit time in the chamber can be limited to be within a prescribed range and the problem of increased amount of fumes drifting inside the chamber due to clogging of the filter can be corrected.

BRIEF DESCRIPTION OF DRAWINGS

FIG. 1 is a flowchart illustrating basic constructions (a) and (b), and the state of operation of the Example.

FIG. 2 is a flowchart illustrating basic constructions (a) and (b), and the order of operation of an embodiment for the Example that also allows control to be effected to decrease the rotational speed of the fan of the blower when the amount of circulation per unit time is above the upper limit value.

FIG. 3 is a block diagram showing basic constructions (a) and (b), and an apparatus for carrying out the Example. The large outline arrows indicate the direction of circulation of inert gas-containing gas, and the solid arrows indicate the control direction.

DESCRIPTION OF THE PREFERRED EMBODIMENTS

According to the present invention, amount of circulation of inert gas-containing gas per unit time circulating inside and outside a chamber 1 is measured by an anemometer 2, while rotational speed of a fan of a blower 3 is controlled via a controller 5, measurement is carried out at prescribed time intervals in basic construction (a) and the measurement is carried out continuously in basic construction (b), as is indicated in step 1 for each.

The measurement used is wind speed measurement using a propeller or wind turbine, or pressure measurement depending on an arrangement of a container.

The time intervals in basic construction (a) will differ depending on size of the chamber 1 and the amount of circulation per unit time of the gas, as well as exposure dose of laser beam or electron beam 6, but usually the effect of basic construction (a) can be achieved by setting them to between 10 minutes and 30 minutes.

The continuous measurement in basic construction (b) may employ an original analog system that detects an uninterrupted measured value, or a digital system that establishes time intervals based on individual operating units of a computer, i.e. a quasi-analog system.

Basic construction (b) is superior to basic construction (a) in that it is possible to detect a state in which the amount of circulation per unit time is above upper limit value or below lower limit value by continuous measurement, thus allowing the control in step 2(2) to be carried out rapidly.

However, basic construction (a) allows the measurement to be completed at each prescribed time interval, and considering that it is exceptional for the amount of circulation per unit time to fall below the lower limit value when the time interval has been set to between 10 minutes and 30 minutes, as in step 2 (2), basic construction (a) has a more simple control method than basic construction (b).

The difference between basic construction (a) and basic construction (b), whereby judgment of whether or not the amount of circulation is in the range between the upper limit value and the lower limit value in step 2 is carried out at prescribed time intervals or continuously, is based on the following steps, as shown in the flowchart of FIG. 1 and the block diagram of FIG. 3.

1. The upper limit value and the lower limit value for the amount of circulation of the gas per unit time passing through the anemometer 2 and an adjusting value within the range between the upper limit value and the lower limit value are set, and at the start of gas circulation, a numerical value is selected for the rotational speed of the fan of the blower 3 so that an amount of circulation in the range between the upper limit value and the lower limit value is attained.

2. The amount of circulation per unit time is measured with the anemometer 2 and the amount of circulation is controlled as follows:

(1) When the measured value is within the range between the upper limit value and the lower limit value, the rotational speed of the fan of the blower 3 is maintained.

(2) When the measured value has fallen below the lower limit value due to clogging of filter 41, the rotational speed of the fan of the blower 3 is increased and the rotational speed is selected at the stage where the measured value has reached the adjusting value, and the rotational speed is maintained.

3. The control of above step 2 is repeated until circulation of the gas is complete.

In step 1, the amount of circulation of the gas per unit time is set not by a specific standard value but by the upper limit value and the lower limit value, thus allowing appropriate amount of circulation to be set by a prescribed numeric width, because if it has been set to the specific standard value it will be necessary to carry out the control of step 2(2) more frequently, making it extremely difficult to accomplish stable control.

Further, at the start of the gas circulation in step 1, the rotational speed of the fan of the blower 3 is selected to be the numerical value resulting in the amount of circulation per unit time that is between the range of the upper limit value and the lower limit value, so that appropriate circulation is provided at the start of the circulation operation.

Since decrease in the amount of circulation of the gas per unit time due to clogging of the filter 41 is the reason for carrying out control, it is limited to the control of step 2(2), when the amount of circulation per unit time falls below the lower limit value as in step 2(2).

During the control of step 2(2), the rotational speed of the fan of the blower 3 is adjusted based on the adjusting value between the upper limit value and the lower limit value, because selection and maintenance of the amount of circulation per unit time based on the adjusting value in this way can provide a suitable amount of circulation per unit time, as in step 2(1).

However, the blower 3 and the filter 41 do not always operate normally.

That is, since the amount of circulation per unit time may exceed the upper limit value in exceptional cases due to accidents during functioning of the blower 3 or the filter 41, an embodiment may be employed in which measurement and control by the following step are added to step 2 of basic constructions (a) and (b), in addition to steps (1) and (2).

(3) When the measured value has increased above the upper limit value, the rotational speed of the fan of the blower 3 is decreased and the rotational speed is selected at the stage where the measured value has reached the adjusting value, and the rotational speed is maintained.

The rotational speed will normally be selected so that the adjusting value is equal to or greater than the arithmetic mean value or geometrical mean value between the upper limit value and lower limit value.

An amount of circulation that is not the mean value itself but equal to or greater than the mean value is selected because clogging of the filter 41 is usually continuous, and in the vast majority of cases, the amount of circulation per unit time gradually decreases after the control of step 2(2) has been effected.

The adjusting value, therefore, can also be selected as an amount of circulation per unit time that is the upper limit value itself or its approximated value.

An embodiment may also be employed for basic constructions (a) and (b), in which the degree of increase in the rotational speed of the fan of the blower 3 in the control of 2(2) gradually decreases with the passage of time.

For this embodiment, a rotational speed may be selected that allows target adjusting value to be achieved correctly after first rapidly decreasing or increasing the rotational speed of the fan.

An embodiment may be employed for basic construction (a) in which the difference between the measured value in step 2 (2) and the lower limit value, and the degree of increase in the rotational speed of the fan of the blower 3, are in a proportional relationship.

With this embodiment, it is possible to rapidly control the amount of circulation to the adjusting value regardless of size of the difference.

For basic construction (b), an embodiment may be employed in which the degree of increase in the rotational speed of the fan of the blower 3 in step 2(2) is set to be higher when the amount of circulation per unit time measured based on the prescribed time interval falls below the lower limit value at a greater frequency.

With this embodiment, it is possible to carry out both rapid control and stable control.

The invention will now be explained by an example.

EXAMPLE

For basic constructions (a) and (b), the rotational speed of the fan is increased as in step 2(2), due to clogging of the filter 41, and such cumulative increase leads to gradual increase in the rotational speed of the fan.

Moreover, as clogging of the filter 41 approaches its limit, the rotational speed of the fan also reaches a correspondingly high rotational speed compared to the initial state where clogging has not occurred.

This Example is characterized in that, two or more filters 41 that trap fumes are installed in parallel, as shown in the flowcharts in FIG. 1 and FIG. 2 and the block diagram of FIG. 3, while a maximum value is set for the rotational speed of the fan of the blower 3, with the rotational speed of the fan being measured at the stage of step 2 in basic constructions (a) and (b), or at a stage after step 2, and when the rotational speed of the fan that produces the amount of circulation per unit time measured in step 2 has reached a rotational speed that is equal to or greater than the maximum value, the filter 41 that is currently operating is switched to the other filter 41 by activation of a switching valve 42.

Incidentally, the flowcharts in FIG. 1 and FIG. 2 show cases where measurement and switching are carried out at a stage after the stage of step 2.

For this Example, switching of the filter 41 due to clogging is automatically carried out, making it possible to avoid interruption of the three-dimensional shaping operation due to switching of the filter 41.

The maximum rotational speed will depend on the degree of clogging when it is near the limit, but if the maximum rotational speed has been set to be within normal fan rotational speed, then the filter 41 can be automatically switched in sequence while in a stable state, allowing smooth three-dimensional shaping to be carried out.

INDUSTRIAL APPLICABILITY

The present invention is innovative in that the amount of fumes drifting in the chamber are set to be within a prescribed range by setting the amount of circulation of the inert gas-containing gas per unit time in the chamber to be within a suitable range, so that uniform sintering is carried out with a laser beam or electron beam, and the invention therefore has a very wide scope of application.

REFERENCE SIGNS LIST

1: Chamber
2: Anemometer
3: Blower
4: Fume collector
41: Filter
42: Switching valve
5: Controller
6: Laser beam or electron beam

The invention claimed is:

1. A method for producing a three-dimensional shaped product which employs a forming step in a shaping region, based on dispersion of powder by a squeegee on a shaping table disposed within a chamber and irradiation onto powder layers formed by the dispersion with a laser beam or electron beam, wherein a filter that removes fumes generated from the powder layers due to the irradiation in a fume collector that traps the fumes, a blower that circulates inert gas-containing gas inside and outside the chamber, and an anemometer that communicates with the blower are installed, wherein two said filters that trap fumes are installed in parallel, and the method including the step of controlling the amount of circulation of gas per unit time being circulated inside and outside the chamber by the following steps:
1. setting an upper limit value and a lower limit value for the amount of circulation of gas per unit time passing through the anemometer, and
2. setting an adjusting value within the range between the upper limit value and the lower limit value not by a specific standard value to accomplish stable and infrequent control,
3. selecting, at the start of gas circulation, a numerical value for the rotational speed of a fan of a blower not by a specific standard value so that an amount of circulation in the range between the upper limit value and the lower limit value is attained,
4. measuring the amount of circulation per unit time at prescribed time intervals with the anemometer to provide a measured value,
5. setting a maximum value for the rotational speed of the fan of the blower, with the rotational speed of the fan being measured at or after step 4,
6. controlling the amount of circulation as follows:
    (1) maintaining the rotational speed of the fan of the blower when the measured value is within the range between the upper limit value and the lower limit value,
    (2) increasing the rotational speed of the fan of the blower when the measured value has fallen below the lower limit value due to clogging of the filter,
    (3) selecting the rotational speed at the stage where the measured value has reached the adjusting value, and maintaining the rotational speed at this adjusting value,
7. switching the filter that is currently operating to the other filter by activation of a switching valve, when the rotational speed of the fan that produces the amount of circulation per unit time measured in step 4 has reached a rotational speed that is equal to or greater than the maximum value, and
8. repeating the control of the above steps 6 and 7 until circulation of the gas is complete.

2. The method for producing a three-dimensional shaped product according to claim 1, wherein the step of controlling further includes:
    (4) decreasing the rotational speed of the fan of the blower when the measured value has increased above the upper limit value, and
    (5) selecting the rotational speed at the stage where the measured value has reached the adjusting value, and maintaining the rotational speed at this adjusting value.

3. The method for producing a three-dimensional shaped product according to claim 1, wherein the difference between the measured value in step 6(2) and the lower limit value, and the degree of increase in the rotational speed of the fan, are in a proportional relationship.

4. A method for producing a three-dimensional shaped product which employs a forming step in a shaping region, based on dispersion of powder by a squeegee on a shaping table disposed within a chamber and irradiation onto powder layers formed by the dispersion with a laser beam or electron beam, wherein a filter that removes fumes generated from the powder layers due to the irradiation in a fume collector that traps the fumes, a blower that circulates inert gas-containing gas inside and outside the chamber, and an anemometer that communicates with the blower are installed, wherein two said filters that trap fumes are installed in parallel, and the method including the step of controlling the amount of circulation of gas per unit time being circulated inside and outside the chamber by the following steps:
1. setting an upper limit value and a lower limit value for the amount of circulation of gas per unit time passing through the anemometer, and
2. setting an adjusting value within the range between the upper limit value and the lower limit value not by a specific standard value to accomplish stable and infrequent control,
3. selecting, at the start of gas circulation, a numerical value for the rotational speed of a fan of a blower not by a specific standard value so that an amount of circulation in the range between the upper limit value and the lower limit value is attained,
4. continuously measuring the amount of circulation per unit time with the anemometer to provide a measured value, and
5. setting a maximum value for the rotational speed of the fan of the blower, with the rotational speed of the fan being measured at or after step 4,
6. controlling the amount of circulation as follows:
    (1) maintaining the rotational speed of the fan of the blower when the measured value is within the range between the upper limit value and the lower limit value,
    (2) increasing the rotational speed of the fan of the blower when the measured value has fallen below the lower limit value due to clogging of the filter, and
    (3) selecting the rotational speed at the stage where the measured value has reached the adjusting value, and maintaining the rotational speed at this adjusting value,
7. switching the filter that is currently operating to the other filter by activation of a switching valve, when the rotational speed of the fan that produces the amount of circulation per unit time measured in step 4 has reached a rotational speed that is equal to or greater than the maximum value, and
8. repeating the control of the above steps 6 and 7 until circulation of the gas is complete.

5. The method for producing a three-dimensional shaped product according to claim 4, wherein the step of controlling further includes:
    (4) decreasing the rotational speed of the fan of the blower when the measured value has increased above the upper limit value, and
    (5) selecting the rotational speed at the stage where the measured value has reached the adjusting value, and maintaining the rotational speed at this adjusting value.

6. The method for producing a three-dimensional shaped product according to claim 4, wherein the degree of increase in the rotational speed of the fan of the blower in step 6(2) is set to be higher when the amount of circulation per unit time measured based on the prescribed time interval falls below the lower limit value at a greater frequency.

7. The method for producing a three-dimensional shaped product according to claim 1, wherein the adjusting value in step 6(3) is greater than one of:
   the arithmetic mean value or
   the geometrical mean value of the upper limit value and lower limit value.

8. The method for producing a three-dimensional shaped product according to claim 1, wherein, for the control in step 6(2), further comprising the step of gradually lowering the degree of increase in the rotational speed of the fan of the blower with the passage of time.

9. The method for producing a three-dimensional shaped product according to claim 4, wherein the adjusting value in step 6(3) is greater than one of:
   the arithmetic mean value or
   the geometrical mean value of the upper limit value and lower limit value.

10. The method for producing a three-dimensional shaped product according to claim 4, wherein, for the control in step 6(2), further comprising the step of gradually lowering the degree of increase in the rotational speed of the fan of the blower with the passage of time.

\* \* \* \* \*